United States Patent [19]

Tanaka et al.

[11] Patent Number: 5,034,451
[45] Date of Patent: Jul. 23, 1991

[54] WATER-SOLUBLE BINDER AND HOT-MELT BINDER FOR CERAMICS MOLDING

[75] Inventors: Taku Tanaka, Okayama; Toshiaki Sato, Kurashiki; Hitoshi Maruyama, Kurashiki; Junnosuke Yamauchi, Kurashiki; Takuji Okaya, Nagaokakyo, all of Japan

[73] Assignee: Kuraray Co., Ltd., Kurashiki, Japan

[21] Appl. No.: 275,502

[22] Filed: Nov. 23, 1988

Related U.S. Application Data

[63] Continuation of Ser. No. 908,013, Sep. 16, 1986, abandoned.

[30] Foreign Application Priority Data

Sep. 24, 1985 [JP] Japan ................... 60-211588
Sep. 24, 1985 [JP] Japan ................... 60-211589
Sep. 24, 1985 [JP] Japan ................... 60-211590
Sep. 24, 1985 [JP] Japan ................... 60-211591

[51] Int. Cl.$^5$ ............................................. C08L 29/04
[52] U.S. Cl. ................................... 524/557; 524/404; 524/413; 524/420; 524/428; 524/430; 524/431; 524/432; 524/433; 524/436; 524/401; 525/60

[58] Field of Search ............... 524/401, 404, 413, 420, 524/428, 430, 431, 432, 433, 436, 557; 525/60

[56] References Cited

U.S. PATENT DOCUMENTS 4,492,783  1/1985  Tanaka et al. ................... 525/60 X

FOREIGN PATENT DOCUMENTS 0116300  8/1984  European Pat. Off. .
0020131  5/1967  Japan ................... 525/60
0063407  6/1978  Japan ................... 524/377
0138036  10/1979  Japan ................... 525/60
0249633  9/1968  U.S.S.R. ................... 525/60
0743165  1/1956  United Kingdom ................... 525/60

Primary Examiner—Joseph L. Schofer
Assistant Examiner—J. M. Reddick
Attorney, Agent, or Firm—Oblon, Spivak, McClelland, Maier & Neustadt

[57] ABSTRACT

This invention provides a water-soluble binder and a hot-melt binder for ceramics molding, said binder being composed of a polyvinyl alcohol-based copolymer containing (meth)allyl group-containing nonionic monomer units or nitrogeneous group-containing nonionic monomer units.

13 Claims, No Drawings

WATER-SOLUBLE BINDER AND HOT-MELT BINDER FOR CERAMICS MOLDING

This is a continuation of application Ser. No. 06/908,013, filed Sept. 16, 1986, now abandoned.

BACKGROUND OF THE INVENTION

1. Field of the Invention:

The present invention relates, in an aspect, to a water-soluble binder for ceramics molding and, in another aspect, to a hot-melt binder for ceramics molding.

The common steps employed in the production of ceramics products includes the formation of green body from a mixture of ceramics powder and a binder, the heating of the green body to remove the binder through its thermal decomposition, and sintering. A preferred water-soluble binder for ceramics molding is a polyvinyl alcohol-based polymer, which has a satisfactory power to bind ceramics particles, has a high cohesive strength, and is easy to handle in the aqueous system.

Greenbody is generally required to have a high mechanical strength and high dimensional accuracy. In addition, it is desirable that green body be produced efficiently no matter how complex it might be in shape.

2. Description of the Prior Art:

Ceramics green body is produced by a variety of methods, e.g., press molding, slurry molding, sheet molding, extrusion molding, and injection molding. In many of the molding methods which employ water as a medium, a polyvinyl alcohol-based polymer is used by preference because of its advantageous features. That is, it is soluble in water, it powerfully binds inorganic particles, and hence it provides high-strength green body capable of easy handling in such as fabrication ( e.g.,cutting ) prior to sintering. Polyvinyl alcohol (abbreviated as PVA hereinafter), however, has a disadvantage of being stiff resulting from its high crystallinity. That is when PVA is used as a binder in press molding, it is necessary to increase the molding pressure. Sheet molding has a disadvantage that it requires a large amount of plasticizer, whose migration and moisture sensitivity are a problem. Among the above-mentioned molding methods, injection molding is one which satisfies the requirements for high productivity and ability to produce complex shapes. However, the conventional PVA-based polymer cannot be applied to injection molding involving hot-melting, because it has a melting point close to a decomposition temperature.

SUMMARY OF THE INVENTION

It is an object of the present invention to provide a PVA-based copolymer which is soft and can be used as a binder for ceramics molding which is performed in the aqueous system.

It is another object of the present invention to provide a PVA-based copolymer for ceramics molding which is performed by hot-melting.

DETAILED DESCRIPTION OF THE PREFERRED EMBODIMENTS

The description of the invention will be given in two parts.

[I] Water-soluble binder for ceramics molding

The present inventors carried out a series of investigations in search for a new PVA-based copolymer which has as good a binding power for inorganic solids as the conventional PVA-based polymer and yet is soft and capable of being used in an aqueous system. As a result, it was found that the requirement is achieved by a water-soluble PVA-based copolymer containing 20 to 90 mol% of vinyl alcohol units, said copolymer being obtained by saponifying a copolymer composed of a vinyl ester and a (meth)allyl group-containing nonionic monomer capable of radical copolymerization with the vinyl ester, or a copolymer composed of a vinyl ester and a nitrogeneous group-containing nonionic monomer capable of radical copolymerization with the vinyl ester. This finding led to the present invention.

The present invention relates to a water-soluble organic binder to be used when ceramics green body is produced. It is a polyvinyl alcohol-based copolymer containing 20 to 90 mol% of vinyl alcohol units, said copolymer being obtained by saponifying a copolymer composed of a vinyl ester and a (meth)allyl group-containing nonionic monomer capable of radical copolymerization with the vinyl ester, or a copolymer composed of a vinyl ester and a nitrogeneous group-containing nonionic monomer capable of radical copolymerization with the vinyl ester.

The water-soluble binder of this invention should meet the following requirements. (1) It should be soluble in water. (2) It should provide easy-to-handle green body having a high strength. (3) It should be soft. (4) It should decompose rapidly upon heating leaving no carbonaceous residues. One which meets these requirements is a PVA-based copolymer having an average degree of polymerization not more than 2000, preferably not more than 1000, and not less than 100, containing 20 to 90 mol%, preferably 40 to 90 mol%, of vinyl alcohol units, and containing 0.5 to 30 mol%, more preferably 2 to 20 mol%, most preferably 5 to 20 mol% of (meth)allyl group-containing nonionic monomer units or nitrogeneous-group containing nonionic monomer units.

With an average degree of polymerization in excess of 2000, the binder forms an aqueous solution or slurry having an excessively high viscosity. On the other hand, the one having an average degree of polymerization lower than 100 provides brittle green body. The binder containing more than 90 mol% of vinyl alcohol units is excessively hard, and the one containing less than 20 mol% of vinyl alcohol units provides weak green body. If the binder contains more than 30 mol% of (meth)allyl group-containing nonionic monomer units or nitrogeneous group-containing nonionic monomer units, it provides weak green body. If the content of these units is less than 0.5 mol%, the binder is neither water-soluble nor soft satisfactorily. The more nonionic monomer units the binder contains, the more readily the binder undergoes thermal decomposition.

The vinyl ester that can be used in this invention includes vinyl formate, vinyl acetate, and vinyl propionate, among which vinyl acetate is particularly preferable.

The (meth)allyl group-containing nonionic monomer capable of radical copolymerization with the vinyl ester includes, for example, (meth)allyl alcohol, (meth)allyl acetate, dimethylallyl alcohol, ally acetone, allyl ethyl ether, and allyl glycidyl ether, among which (meth)allyl alcohol, (meth)allyl acetate, and dimethyl allyl alcohol are preferable, particularly (meth)allyl acetate.

The nitrogeneous group-containing nonionic monomer capable of radical copolymerization with the vinyl ester includes, for example, N-vinyl pyrrolidone, (meth- )acrylamide, and N-alkyl-substituted (meth)acrylamide having a $C_1$-$C_3$ substituent group such as N-methyl (meth)acrylamide, N,N-dimethyl (meth)acrylamide, N-ethyl (meth)acrylamide, and (N-propyl (meth)acrylamide .

The nonionic monomer may be used in combination with one or more members of other monomers within limits not harmful to the effect of the invention. Examples of such monomers include α-olefins such as ethylene, propylene, and 1-butene , (meth)acrylate ester such as methyl (meth)acrylate, ethyl (meth)acrylate, and butyl (meth)acrylate , and ionic monomers such as (meth)acrylic acid and a salt thereof, itaconic acid and a salt thereof, maleic acid and a salt thereof, fumaric acid and a salt thereof, maleic anhydride, 2-acrylamide propane sulfonic acid and a salt thereof, (meth)ally sulfonic acid and a salt thereof, and (meth)acrylamide propyl trimethylammonium chloride . These copolymerizable monomers may be used individually or in combination with one another.

The ionic monomers are preferable from the standpoint of water solubility of the resulting binder. The amount of the ionic monomers should preferably be less than 0.5 mol% especially in the case where the ionic monomer forms a metal salt upon saponification , because the binder containing such ionic monomers has an excessively high humidity sensitivity and causes anomalous crystal growth due to the residual alkali metal salt.

That the PVA-based copolymer of this invention is soluble in water means that the PVA-based copolymer completely dissolves or disperses in water at 25° C. at a concentration of 1 wt %.

The average degree of polymerization ($\bar{P}$) is calculated from the following formula.

$$P = \left( \frac{[\eta] \times 1000}{7.94} \right)^{1/0.62}, [\eta] = \frac{\eta sp/C}{1 + 0.275 \, \eta sp}$$

where [η] is the viscosity of polyvinyl ester copolymer before saponification measured in acetone at 30° C.

According to the present invention, the above-mentioned PVA-based copolymer is used as a water-soluble binder for ceramics molding. The binder may be used in combination with a dispersant and lubricant. Examples of inorganic dispersant include ammonium phosphate, sodium phosphate, sodium hydroxide, ammonium citrate, and sodium citrate. Examples of organic dispersant include amines, pyridine, piperidine, metal salts or ammonium salts of polyacrylic acid, metal salts or ammonium salts of copolymers composed of styrene or isobutene and maleic anhydride, and polyoxyethylene nonyl phenol ether.

The lubricant is a common one which includes natural wax like bee wax and Japan wax; synthetic wax like paraffin wax, microcrystalline wax, and low-molecular weight polyethylene and derivatives thereof; fatty acid like stearic acid and lauric acid; metal salts of fatty acids like magnesium stearate and calcium stearate; fatty acid amides like oleinamide and stearamide; and polyethylene glycol. These lubricants may be used in the form of aqueous dispersion.

The PVA-based copolymer of this invention may be used in combination with other organic binder and plasticizer within limits not harmful to the effect of the invention. The organic binder is an aqueous emulsion of water-soluble polymer or hydrophobic polymer which is commonly used for ceramics molding.

The plasticizer includes polyhydric alcohols such as ethylene glycol, propylene glycol, glycerin, mannitol, and sorbitol, and derivative thereof; and esters such as diethyl phthalate.

The ceramics powders to which the PVA-based copolymer of this invention is applied are powders of oxides or non-oxides of metals or non-metallic substances which are commonly used in the production of ceramics body. They may be of a single composition or in the form of compound, and they may be used individually or in combination with one another. The oxides or non-oxides of metals may be constructed of cations and anions either or both of which may consist of one member of element or different members of elements. The oxides and non-oxides may contain additives for the improvement of their characteristics.

Examples of the ceramics powders include oxides, carbides, nitrides, borides, and sulfides of Li, K, Be, Mg, B, Al, Si, Cu, Ca, Br, Ba, Zn, Cd, Ga, In, lanthanides, actinides, Ti, Zr, Hf, Bi, V, Nb, Ta, W, Mn, Fe, Co, and Ni. The oxIde powders include the so-called double oxides which contain two or more metal elements. Such double oxides are classified according to the crystal structure. Those of perovskite type structure include $NaNbO_3$, $SrZrO_3$, $PbZrO_3$, $SrTiO_3$, $BaZrO_3$, $PbTiO_3$, and $BaTiO_3$; those of spinel type structure include $MgAl_2O_4$, $ZnAl_2O_4$, $CoAl_2O_4$, $NiAl_2O_4$, and $MgFe_2O_4$; those of ilmenite type structure include $MgTiO_3$, $MnTiO_3$, and $FeTiO_3$; and those of garnet type structure, include $GdGa_5O_{12}$ and $Y_3Fe_5O_{12}$.

The PVA-based copolymer of this invention may be advantageously applied to the oxide powders, particularly metal oxide powders for electronics materials, magnetic materials, optical materials, and high temperature materials.

The PVA-based copolymer of this invention may be advantageously applied to the precursor which becomes an oxide or non-oxide of a metal or non-metallic substance upon heat treatment at a high temperature after sheet molding. Examples of such precursors include alcoholates of metals or mon-metallic substances, hydroxide sol obtained from them by hydrolysis, silica sol obtained from water glass, basic metal chlorides, and metal salts of sulfate, nitrate, formate, and acetate.

The PVA-based copolymer of this invention may be used in an amount of 0.2 to 20 parts by weight, preferably 1 to 15 parts by weight (as solids) for 100 parts by weight of ceramics powder.

The PVA-based copolymer of this invention is usually used in the form of an aqueous solution, and also is to be used as a powder which can be added to the ceramics aqueous slurry in the form of powder.

The PVA-based copolymer of this invention may be advantageously used in a variety of ceramics molding processes which include press molding, slurry molding, sheet molding, and extrusion molding, all of which uses water as a medium. It is advantageously used in press molding and sheet molding, particularly sheet molding.

As mentioned above, the PVA-based copolymer of this invention is a soft polymer and it can be used as an aqueous binder for ceramics molding. It is effective only when it contains 0.5 to 30 mol% of (meth)allyl group-containing nonionic monomer units or nitrogenous group-containing nonionic monomer units, contains 20 to 90 mol% of vinyl alcohol units, and has an average degree of polymerization of 100 to 200. The PVA-based copolymer of this invention was unexpectedly found to produce remarkable effects in ceramics molding as follows: (1) In press molding, it provides green body of high strength, high density, and complex shape with a low molding pressure. (2) In sheet molding, it provIdes flexible green sheets with a small amount of or none of plasticizer. (3) In all the molding methods, it provides green body strong enough to facilitate handling or fabrication prior to sintering.

[II] Hot-melt binder for ceramics molding

The present Inventors carried out a series of investigations in search for a new PVA-based copolymer which has as good a binding power for inorganic solids as the conventional PVA-based polymer and yet is applicable to ceramics green body which is formed by hot-melting. As a result, it was found that the requirement is achieved by a PVA-based copolymer having a softening point which is defined hereinafter not more than 160 ° C., preferably not more than 130 ° C., said copolymer being obtained by saponifying a copolymer composed of a vinyl ester and a (meth)allyl group-containing nonionic monomer capable of radical copolymerization with the vinyl ester, or a copolymer composed of a vinyl ester and a nitrogeneous group-containing nonionic monomer capable of radical copolymerization with the vinyl ester. This finding led to the present invention.

The present invention relates to a hot-melt organic binder to be used where ceramics powder is made into green body which is subsequently sintered. It is a PVA-based copolymer having a sotening point not more than 160° C., preferably not more than 130° C., said copolymer being obtained by saponifying a copolymer composed of a vinyl ester and a (meth)allyl group-containing nonionic monomer capable of radical copolymerization with the vinyl ester, or a copolymer composed of a vinyl ester and a nitrogeneous group-containing nonionic monomer capable of radical copolymerization with the vinyl ester.

The hot-melt binder of this invention should meet the following requirements. (1) It should have a proper melt viscosity. (2) It should provide easy-to-handle green body having a high strength. (3) It should decompose rapidly upon heating leaving no carbonaceous residues. One which meets these requirements is a PVA-based copolymer having a softening point not more than 160° C., preferably not more than 130° C., having an average degree of polymerization not more than 1000, preferably not more than 700,and more preferably not more than 500 and not less than 100, containing 20 to 80 mol% of vinyl alcohol units, and containing 0.5 to 30 mol%, preferably 0.5 to 20 mol%, more preferably 1 to 15 mol% of nonionic monomer unit.

With an average degree of polymerization in excess of 1000, the binder has an excessively high melt viscosity; on the other hand, the one having an average degree of polymerization lower than 100 provides weak green body. The binder containing more than 80 mol% of vinyl alcohol units has an excessively high sotening point, and the one containing less than 20 mol% of vinyl alcohol units provides weak green body. If the binder contains more than 30 mol% of nonionic monomer units, it provides weak green body. If the content of these units is less than 0.5 mol%, the binder is poor in thermal decomposition.

The vinyl ester that can be used in this invention includes vinyl formate, vinyl acetate, and vinyl propionate, among which vinyl acetate is particularly preferable.

The (meth)allyl group-containing nonionic monomer capable of radical copolymerization with the vinyl ester includes, for example, (meth)allyl alcohol, (meth)allyl acetate, dimethylallyl alcohol, ally acetone, allyl ethyl ether, and allyl glycidyl ether, among which (meth)allyl alcohol, (meth)allyl acetate, and dimethyl allyl alcohol are preferable, particularly (meth)allyl acetate.

The nitrogeneous group-containing nonionic monomer capable of radical copolymerization with the vinyl ester includes, for example, N-vinyl pyrrolidone, (meth)acrylamide, and N-alkyl-substituted (meth)acrylamide having a $C_1$-$C_3$ substituent group such as N-methyl (meth)acrylamide, N,N-dimethyl (meth)acrylamide, N-ethyl (meth)acrylamide, and (N-propyl (meth)acrylamide .

The nonionic monomer may be used In combination with one or more members of other monomers capable of radical copolymerization within limits not harmful to the effect of the invention. Examples of such monomers were given in the previous explanation about the water-soluble binder for ceramics molding. The amount of the ionic monomers should preferably be less than 0.5 mol% especially in the case where the ionic monomer form a metal salt upon saponification. The binder containing such ionic monomers has an excessively high humidity sensitivity and causes anomalous crystal growth due to the residual alkali metal salt.

The softening point of the PVA-based copolymer of this invention is defined by the temperature at which the copolymer containing 5 wt% of water begins to be extruded out from a nozzle 1 mm in diameter and 1 mm long attached to a flow tester when heated at a rate of 6° C./min under a load o 30 kg.

The average degree of polymerization ($\overline{P}$) is calculated from the following formula.

$$P = \left( \frac{[\eta] \times 1000}{7.94} \right)^{1/0.62}, [\eta] = \frac{\eta sp/C}{1 + 0.275 \, \eta sp}$$

where [$\eta$] is the viscosity of polyvinyl ester copolymer before saponification measured in acetone at 30° C.

According to the present invention, the above-mentioned PVA-based copolymer is used as a binder for hot-melt ceramics molding such as injection molding. The binder may be used in combination with a thermoplastic substance, plasticizer, and lubricant within limits not harmful to the effect of the invention. Examples of the thermoplastic substance include poly(meth)acrylate esters, polyolefins, polyvinyl esters, styrene polymer and copolymers, waxes, and paraffins. Examples of the plasticizer include water, polyhydric alcohols such as ethylene glycol, diethylene glycol, and glycerin and derivatives thereof, and diethyl phthalate and other esters. They may be used individually or in combination with one another. Examples of the lubricant include stearic acid, wax, and paraffin.

The ceramics powders to which the PVA-based copolymer of this invention is applied are as enumerated in the previous explanation of water-soluble binder for ceramics molding.

The following are the steps of producing ceramics products by hot-melting with the aid of the PVA-based copolymer of this invention.

(1) Mixing: At first, 100 parts by weight of ceramics powder, 3 to 40 parts, preferably 10 to 25 parts by weight of PVA-based copolymer, and 0.1 to 10 parts by weight of additives are uniformly mixed with one another at 10 to 200° C., preferably 20 to 160° C. If necessary, they may be mixed with a solvent (e.g., water and alcohol) of the PVA-based copolymer or a plasticizer having a boiling point not more than 250 ° C.

The mixture is made into a molding material by pelletizing or crushing in the usual way. Where a solvent or low-boiling plasticizer is used, it may be partly or entirely removed by evaporation before, during, or after the pelletization process.

(2) Molding: The molding material prepared as mentioned above is subjected to injection molding or extrusion molding in the usual way. The molding temperature is 60 to 240° C., preferably 80 to 200° C.

(3) Removal of binder and sintering: These steps may be carried out sequentially or separately. Sintering may be performed in the usual way to give sintered products.

The PVA-based copolymer of this invention functions as a hot-melt binder for green body in the ceramics molding, only when it has a softening point not more than 160° C., preferably not more than 130° C., has an average degree of polymerization of 100 to 1000, and contains 20 to 80 mol% of vinyl alcohol units and 0.5 to 30 mol% of (meth)allyl group-containing nonionic monomer units or nitrogeneous group-containing nonionic monomer units. The binder meeting the above-mentioned requirements provides high-strength green body of ceramics.

The invention is now described in more detail with reference to the following non-limitative examples, in which "parts" and "%" are based on weight.

(1) Synthesis of polyvinyl alcohol-based copolymer

A reactor was charged with 1125 parts of vinyl acetate (VAc), 150 parts of allyl acetate (AAc), and 1570 parts of methanol. The atmosphere in the reactor was completely replaced with nitrogen. The external temperature was raised to 65° C., and when the internal temperature had reached 60° C., 19.5 parts of 2,2'-azobisisobutyronitrile was added to initiate polymerization. Five hours later, when conversion to polymer reached 70%, the reactor was cooled to suspend polymerization. Unreacted VAc and AAc were eliminated under reduced pressure by adding methanol. Thus there was obtained a methanol solution of VAc-AAc copolymer.

A portion of this copolymer was purified by twice reprecipitation with n-hexane from acetone solution. According to NMR analysis, the to have a degree of polymerization of 256 calculated from $[\eta]$ measured in acetone at 30 ° C.

A portion of the methanol solution (60%) of VAc-AAc copolymer was saponified at 40° C. at a molar ratio of 0.0060 for [NaOH]/[VAc+AAc], to give polyvinyl alcohol copolymer. It was washed and purified with a mixed solvent of methyl acetate and methanol (70/30 by weight). According to NMR analysis, the polyvinyl alcohol copolymer was found to contain 60.5 mol% of vinyl alcohol units.

The polyvinyl ester copolymer thus obtained is designated as Polymer 1, and the polyvinyl alcohol copolymer obtained by saponification of Polymer 1 is designated as Polymer 1A. Polymers 2 to 6 and Polymers 2A to 6A were prepared in the same manner as above. The characteristic properties of these polymers are shown in Table 1. For comparison, Polymers 7 to 17 and Polymers 7A to 17A as shown in Table 1 were prepared.

TABLE 1

| Polyvinyl ester copolymer | | | Polyvinyl alcohol copolymer | | | | |
|---|---|---|---|---|---|---|---|
| Polymer No. | Composition (mol %) *1 | Degree of polymerization | Polymer No. | Content of vinyl alcohol units (mol %) | Water *2 solubility | Thermal *3 decomposition | Softening *4 point (°C.) |
| 1 | VAc/AAc (89.8/10.2) | 256 | 1A | 60.5 | -Δ | ⊙ | 92.5 |
| 2 | VAc/DMAAl (85.7/14.3) | 291 | 2A | 57.2 | -Δ | ⊙ | 89.5 |
| 3 | VAc/AAl (96.5/3.5) | 310 | 3A | 63.7 |  | ⊙ | 108 |
| 4 | VAc/AAc/IA (90.5/9.05/0.45) | 285 | 4A | 60.8 |  | ⊙ | 91.5 |
| 5 | VAc/NVP (95.5/4.5) | 290 | 5A | 63.0 |  | ⊙ | 101 |
| 6 | VAc/DMAAm (92.5/7.5) | 305 | 6A | 62.1 |  | ⊙ | 92 |
| 7 | VAc/MA (94.8/5.2) | 257 | 7A | 62.5 | Δ- |  | 95 |
| 8 | VAc/MMA (94.5/5.5) | 240 | 8A | 61.7 | Δ- |  | 92 |
| 9 | VAc/SAS (99.0/1.0) | 300 | 9A | 62.0 |  | Δ | 91.5 |
| 10 | VAc/SAS (94.5/5.5) | 230 | 10A | 61.3 |  | X | 102 |
| 11 | VAc (100) | 300 | 11A | 88.0 |  | Δ | 161 |
| 12 | VAc (100) | 300 | 12A | 69.0 | Δ | Δ | 145 |
| 13 | VAc (100) | 300 | 13A | 60.5 | X | — | 115 |
| 14 | VAc (100) | 300 | 14A | 48.0 | X | — | 79 |
| 15 | VAc/AAc (89.8/10.2) | 256 | 15A | 18.0 | X |  | 65 |
| 16 | VAc/AAc (89.8/10.2) | 256 | 16A | 95.0 |  | ⊙ | 148 |

TABLE 1-continued

| | Polyvinyl ester copolymer | | | Polyvinyl alcohol copolymer | | | |
|---|---|---|---|---|---|---|---|
| Polymer No. | Composition (mol %) *1 | Degree of polymerization | Polymer No. | Content of vinyl alcohol units (mol %) | Water *2 solubility | Thermal *3 decomposition | Softening *4 point (°C.) |
| 17 | VAc/AAc (68.5/31.5) | 200 | 17A | 60.5 | | ⊙ | 70 |

Notes to Table 1.
*1 DMAAl: Dimethylallyl alcohol
AAl: Allyl alcohol
IA: Itaconic acid
NVP: N-vinylpyrrolidone
DMAAm: Dimethylacrylamide
MM: Methyl methacrylate
MMA: Methyl methacrylate
SAS: Sodium allylsulfonate
*2 Water solubility: Tested at a 1% concentration at 25° C.
  : 1% aqueous solution is almost clear.
  Δ: 1% aqueous solution is in the dispersion state.
  X: Polymers is not almost soluble and not dispersed.
*3 Thermal decomposition:
A 50-μm thick film sample was prepared from an aqueous solution of PVA-based polymer by air drying. The sample was decomposed by heating at a rate of 10° C./min and the thermal decomposition was measured using a differential thermobalance (made by Rigaku Denki Co., Ltd.). The atmosphere was air (30 ml/min). The thermal decomposition of a sample was judged from whether the temperature at which 95% of the sample decomposes is lower than that of Polymer 11A.
⊙: The decomposition temperature is lower than that of Polymer 11A.
  : The decomposition temperature is a little lower than that of Polymer 11A.
Δ: The decomposition temperature is almost equal to that of Polymer 11A.
X: The decomposition temperature is higher than that of Polymer 11A.
*4 Softening point: Defined by the temperature at which the copolymer containing 5 wt % of water begins to be extruded out from a nozzle 1 mm in diameter and 1 mm long attached to a flow tester when heated at a rate of 6° c./min under a load of 30 kg.

(2) Experiments with water-soluble binders for ceramics molding

EXAMPLE 1

100 parts of alumina (99.5% purity), 50 parts of water, and 0.2 parts of ammonium salt of polyacrylic acid as a dispersant were subjected to ball milling for 90 hours. To the slurry was added 2 parts (as solids) of Polymer 1A as a binder in the form of aqueous solution. The slurry was made into granules (100±20 μm in particle diameter). The granules were formed into green body under a pressure of 1.2 tons/cm² using a cuboid mold measuring 20 mm wide, 100 mm long, and 10 mm thick. Table 2 shows the strength(toughness) and workability of the green body.

EXAMPLES 2 to 6

Green body was prepared In the same manner as in Example 1 except that the binder was replaced by Polymer 2A to 6A. respectively. The results are shown in Table 2.

COMPARATIVE EXAMPLES 1 to 9

Green body was prepared In the same manner as in Example 1 except that the binder was replaced by Polymer 7A to 12A and 16A to 17A and polyvinyl acetate emulsion, respectively. The results are shown in Table 2.

TABLE 2

| Example No. | Polymer No. | Strength of green body *5 (toughness) | Workability of green body *6 |
|---|---|---|---|
| Example 1 | 1A | 6.0 | ⊙ |
| Example 2 | 2A | 4.0 | ⊙ |
| Example 3 | 3A | 3.6 | ⊙ |
| Example 4 | 4A | 4.5 | ⊙ |
| Example 5 | 5A | 2.5 | ⊙ |
| Example 6 | 6A | 2.9 | ⊙ |
| Comparative Example 1 | 7A | 2.3 | |
| Comparative Example 2 | 8A | 2.1 | |
| Comparative Example 3 | 9A | 2.2 | |
| Comparative Example 4 | 10A | 1.7 | Δ |
| Comparative Example 5 | 11A | 1.0 | Δ |
| Comparative Example 6 | 12A | 1.0 | Δ |
| Comparative Example 7 | Polyvinyl acetate emulsion | 0.3 | X |
| Comparative Example 8 | 16A | 0.5 | X |
| Comparative Example 9 | 17A | 1.5 | X |

Notes to Table 2.
*5 The energy required for a specimen of green body to be broken in the three-point bending test (span: 5 cm, head speed: 0.1 mm/min) is calculated from the area of the S—S curve. The result is expressed in terms of a relative value, with the value in Comparative Example 5 being 1.0.
*6 Workability is expressed in terms of the ease or difficulty of making a hole with a drill.
○: Excellent.  : Good. Δ: Fair, X: Poor.

EXAMPLE 7

100 parts of finely divided high-purity alumina (having an average particle diameter of 0.6 μm and containing 99.9% of $Al_2O_3$), 25 parts of deionized water, and 0.75 parts of dispersant ("Ceramo CD-14", a product of Dai-ichi Kogyo Seiyaku Co., Ltd.) were subjected to ball milling for 24 hours. To the slurry was added 40 parts (10 parts as solids) of Polymer 1A as a binder in the form of 25% aqueous solution. After thorough mixing, there was obtained aqueous slip. The slip was deaerated under vacuum. The slip was forced through a predetermined blade's gap and the resulting sheet was received on a polyester sheet. The sheet was dried at 85° C. for 5 minutes and then at 120° C. for 5 minutes using hot air. Thus there was obtained a 400 μm thick green sheet.

The aqueous slip was superior in flowability, and it provides a green sheet with smooth surface without any crack which was flexible, resilient tough and handle. The results of evaluation are shown in Table 3.

EXAMPLES 8 TO 12

Samples of green sheet were prepared in the same manner as in Example 7 except that Polymer 1A as the binder was replaced by Polymer 2A to 6A, respectively. The results of evaluation are shown in Table 3.

Comparative Examples 10 to 17

Samples of green sheet were prepared in the same manner as in Example 7, except that Polymer 1A as the binder was replaced by Polymer 7A to 12A and 16A to 17A, respectively. The results of evaluation are shown in Table 3.

TABLE 3

| Example No. | Polymer No. | Flexibility of green sheet *7 | Cracks during drying *8 |
|---|---|---|---|
| Example 7 | 1A | 1–2 mm | |
| Example 8 | 2A | 2–3 | |
| Example 9 | 3A | 2–3 | |
| Example 10 | 4A | 2–3 | |
| Example 11 | 5A | 2–3 | |
| Example 12 | 6A | 2–3 | |
| Comparative Example 10 | 7A | 6–8 | Δ |
| Comparative Example 11 | 8A | 6–8 | Δ |
| Comparative Example 12 | 9A | 5–7 | Δ |
| Comparative Example 13 | 10A | 8–10 | Δ |
| Comparative Example 14 | 11A | 12–20 | X |
| Comparative Example 15 | 12A | 10–15 | Δ |
| Comparative Example 16 | 16A | 8–10 | Δ |
| Comparative Example 17 | 17A | 4–5 | Δ |

Notes to Table 3.
*7 The flexibility of green sheet was evaluated as follows: A specimen (30 mm long and 10 mm wide) is held between jaws of a slide caliper. The specimen is bent by gradually closing the jaws until it cracks. The distance of the jaws recorded when cracking occurred is the measure of flexibility. The smaller the value, the higher the flexibility.
*8 Expressed in terms of number of cracks which occur when the green sheet is dried under the drying conditions mentioned in Example 7.
: No cracks. Δ: Some cracks. X: Many cracks

EXAMPLE 13

100 parts of ceramics powder containing 95% of alumina was mixed with 12 parts of Polymer 1A (as shown in Table 1), 3 parts of stearic acid, and 3 parts of diethyl phtalate. After heating and kneading at 120° C. the mixture was roughly crushed to give a molding material. The molding material was injection molded into flat plates of green body, measuring 3 mm thick, 40 mm wide, and 60 mm long, at a molding temperature of 130° C. under an injection pressure of 800 kg/cm, The green body was heated to 550° C. at a rate of 10 to 15° C./hr to remove organic matters. The green body was finally sintered. There was obtained a high-density, crack-free sintered product. The results of evaluation are shown in Table 4.

EXAMPLES 14 to 18

The same procedure as in Example 13 was repeated except that the PVA copolymer was replaced by Polymer 2A to 6A as shown in Table 1, respectively. The results of evaluation are shown in Table 4.

COMPARATIVE EXAMPLES 18 to 27

The same procedure as in Example 13 was repeated except that the PVA copolymer was replaced by Polymer 7A to 15A and 17A as shown in Table 1, respectively. The results of evaluation are shown in Table 4.

TABLE 4

| Example No. | Polymer No. | Appearance of *9 molded product | Handling of *10 molded product |
|---|---|---|---|
| Example 13 | 1A | | |
| Example 14 | 2A | | |
| Example 15 | 3A | | |
| Example 16 | 4A | | |
| Example 17 | 5A | | |
| Example 18 | 6A | | |
| Comparative Example 18 | 7A | Δ | Δ |
| Comparative Example 19 | 8A | Δ | Δ |
| Comparative Example 20 | 9A | Δ | X |
| Comparative Example 21 | 10A | Δ | Δ |
| Comparative Example 22 | 11A | X | — |
| Comparative Example 23 | 12A | X | — |
| Comparative Example 24 | 13A | Δ | Δ |
| Comparative Example 25 | 14A | | X |
| Comparative Example 26 | 15A | X | — |
| Comparative Example 27 | 17A | | X |

Notes to Table 4.
*9 Appearance of injection molded products:
: Good. Δ: Partly rough surface. X: Short shot or no flow.
*10 Handling of injection molded products:
: Tough enough to facilitate handling. Δ: Not tough enough. X: Brittle and difficult to handle.

What is claimed is:

1. A composition for ceramics molding which comprises 100 parts of ceramic powder and 0.2 to 20 parts of a water-soluble binder which comprises a polyvinyl alcohol-based water-soluble copolymer containing 20 to 90 mol% of vinyl alcohol units, said copolymer being obtained by saponifying a copolymer composed of a vinyl ester and at least one member selected from the group consisting of (meth)allyl alcohol, (meth)allyl acetate and dimethylallyl alcohol.

2. The composition as set forth in claim 1, wherein the vinyl ester is vinyl acetate.

3. The composition as set forth in claim 1, wherein the polyvinyl alcohol-based water-soluble copolymer contains 0.5 to 30 mol% of a structural unit which comprises at least one member selected from the group consisting of (meth)allyl alcohol units, (meth)allyl acetate unit and dimethylallyl alcohol unit.

4. The composition as set forth in claim 3, wherein the polyvinyl alcohol-based water-soluble copolymer contains 2 to 20 mol% of a structural unit which comprises at least one member selected from the group consisting of (meth)allyl alcohol unit, (meth)allyl acetate unit and dimethylallyl alcohol unit.

5. The composition as set forth in claim 1, wherein the polyvinyl alcohol-based water-soluble copolymer is obtained by saponifying a copolymer composed of a vinyl ester and (meth)allyl acetate.

6. The composition as set forth in claim 1, wherein the water-soluble binder is a water-soluble binder for sheet molding.

7. The composition as set forth in claim 1, wherein the water-soluble binder is a water-soluble binder for press molding.

8. A composition for ceramics molding which comprises 100 parts of ceramic powder and 3 to 40 parts of a hot-melt binder which comprises a polyvinyl alcohol-based copolymer having a softening point not more than 160° C., said copolymer being obtained by saponifying a copolymer composed of a vinyl ester and at least one member selected from the group consisting of (meth)allyl alcohol, (meth)allyl acetate and dimethylallyl alcohol.

9. The composition as set forth in claim 8, wherein the vinyl ester is vinyl acetate.

10. The composition as set forth in claim 8, wherein the polyvinyl alcohol-based copolymer contains 20 to 80 mol% of vinyl alcohol units and 0.5 to 30 mol% of a structural unit which comprises at least one member selected from the group consisting of (meth)allyl alcohol unit, (meth)allyl acetate unit and dimethylallyl alcohol unit.

11. The composition as set forth in claim 8, wherein the polyvinyl alcohol-based copolymer is obtained by saponifying a copolymer composed of a vinyl ester and (meth)allyl acetate.

12. The composition as set forth in claim 8, wherein the polyvinyl alcohol-based copolymer has a softening point not more than 130° C.

13. The composition as set forth in claim 8, wherein the hot-melt binder is a hot-melt binder for injection molding.

* * * * *